US012749765B2

(12) United States Patent
Chen et al.

(10) Patent No.: US 12,749,765 B2
(45) Date of Patent: Sep. 29, 2026

(54) SEPARATOR AND PREPARATION METHOD THEREOF, SECONDARY BATTERY AND DEVICE

(71) Applicant: CONTEMPORARY AMPEREX TECHNOLOGY (HONG KONG) LIMITED, Hong Kong (CN)

(72) Inventors: Wenhan Chen, Ningde (CN); Shaofei Wang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 439 days.

(21) Appl. No.: 18/517,182

(22) Filed: Nov. 22, 2023

(65) Prior Publication Data

US 2024/0113389 A1 Apr. 4, 2024

Related U.S. Application Data

(63) Continuation of application No. PCT/CN2022/086860, filed on Apr. 14, 2022.

(51) Int. Cl.
*H01M 50/414* (2021.01)
*C08J 5/22* (2006.01)
(Continued)

(52) U.S. Cl.
CPC ......... *H01M 50/414* (2021.01); *C08J 5/2287* (2013.01); *H01M 50/403* (2021.01);
(Continued)

(58) Field of Classification Search
CPC ........... H01M 10/052; H01M 10/0525; H01M 50/409; H01M 50/411; H01M 50/414;
(Continued)

(56) References Cited

U.S. PATENT DOCUMENTS 4,670,146 A 6/1987 Inoue et al.
2016/0149190 A1* 5/2016 Fukuchi ............. H01M 50/426 429/144

FOREIGN PATENT DOCUMENTS

CN 1210823 C 7/2005
CN 101375435 A 2/2009
(Continued)

OTHER PUBLICATIONS

International Search Report mailed on Jan. 17, 2023, received for PCT Application PCT/CN2022/086860, filed on Apr. 14, 2022, 4 pages including English Translation.

(Continued)

*Primary Examiner* — Kevin E Yoon
(74) *Attorney, Agent, or Firm* — XSENSUS LLP

(57) ABSTRACT

The present application provides a separator and a preparation method thereof, a secondary battery, and a device. The separator includes a microporous layer; the microporous layer includes an alkali metal-containing polymer, the alkali metal-containing polymer includes a polymer chain, and the polymer chain includes a first group and a second group; (a) the first group is selected from an organic acid alkali metal group, an alcohol alkali metal group, or a combination thereof; (b) the second group is selected from an organic acid group; an alkali metal content in the first group is 50-100 ppm based on a total mass of the separator; and a hydrogen content in the second group is 10-50 ppm based on the total mass of the separator.

19 Claims, 3 Drawing Sheets

(51) Int. Cl.

| | |
|---|---|
| ***H01M 50/403*** | (2021.01) |
| ***H01M 50/417*** | (2021.01) |
| ***H01M 50/449*** | (2021.01) |
| ***H01M 50/457*** | (2021.01) |
| ***H01M 50/489*** | (2021.01) |

(52) U.S. Cl.
CPC ....... *H01M 50/417* (2021.01); *H01M 50/457* (2021.01); *H01M 50/489* (2021.01); *C08J 2325/08* (2013.01)

(58) Field of Classification Search
CPC . H01M 50/417; H01M 50/449; H01M 50/457
See application file for complete search history.

(56) References Cited

FOREIGN PATENT DOCUMENTS

| | | | |
|---|---|---|---|
| CN | 103283061 | A | 9/2013 |
| CN | 107528086 | A | 12/2017 |
| CN | 108841020 | A | 11/2018 |
| CN | 111916628 | A | 11/2020 |
| CN | 113013548 | A | 6/2021 |
| CN | 113285169 | A | 8/2021 |
| CN | 113381125 | A | 9/2021 |
| CN | 113394514 | A | 9/2021 |
| CN | 113451703 | A | 9/2021 |
| CN | 113594634 | A | 11/2021 |
| JP | 2000-268799 | A | 9/2000 |

OTHER PUBLICATIONS

Extended European Search Report issued Oct. 28, 2024 in European Patent Application No. 22936903.8.

Office Action issued May 10, 2026 in Chinese Patent Application No. 202280039702.3 with English translation thereof.

* cited by examiner

SEPARATOR AND PREPARATION METHOD THEREOF, SECONDARY BATTERY AND DEVICE

CROSS-REFERENCE TO RELATED APPLICATION

This application is a Continuation of International Application No. PCT/CN2022/086860, filed on Apr. 14, 2022, which is incorporated herein by reference in its entirety.

TECHNICAL FIELD

The present application relates to the technical field of batteries, in particular to a separator and a preparation method thereof, a secondary battery, and a device.

BACKGROUND

In recent years, with the application range of secondary batteries being more and more extensive, secondary batteries are widely applied to energy storage power systems such as hydraulic power, firepower, wind power and solar power stations, as well as electric tools, electric bicycles, electric motorcycles, electric vehicles, military equipment, aerospace and other fields. Due to the great development of secondary batteries, higher requirements are put forward for their energy density, cycle performance and safety performance.

In the related art, in order to improve the performance of a separator applied to a secondary battery, various modified materials or coatings are loaded on the surface of a polyolefin separator for the secondary battery. However, separators with better performance are still required in the art.

SUMMARY

The present application has been carried out in view of the above subject matter, and aims to provide a novel separator. When the novel separator is used in a lithium-ion battery, the lithium-ion battery exhibits one or more improved performances, such as reduced DC internal resistance and improved cycle retention.

To achieve the above object, a first aspect of the present application provides a separator. The separator includes a microporous layer, the microporous layer includes an alkali metal-containing polymer, the alkali metal-containing polymer includes a polymer chain, and the polymer chain includes a first group and a second group;

(a) the first group is selected from an organic acid alkali metal group, an alcohol alkali metal group, or a combination thereof;

(b) the second group is selected from an organic acid group;

an alkali metal content in the first group is 50-100 ppm (e.g., 50-60 ppm, 60-70 ppm, 70-80 ppm, 80-90 ppm or 90-100 ppm) based on a total mass of the separator; and a hydrogen content in the second group is 10-50 ppm (e.g., 10-20 ppm, 20-30 ppm, 30-40 ppm, 40-50 ppm) based on the total mass of the separator.

Without theoretical limitation, the separator of the present invention includes the alkali metal-containing polymer component. The separator is used for a lithium-ion battery. In the charging and discharging processes of the battery, the alkali metal-containing polymer may not only improve the lithium ion conductivity of a separator matrix, but also isolate transition metal nickel ions produced by electrolyte corrosion from shuttling to a surface of a negative electrode, and may also selectively block solvation molecules through micropores, so as to slow down the migration of transition metals Ni, Co and Mn to the negative electrode and catalytic decomposition on an SEI film during the storage or use of the battery, thereby improving the capacity retention of the battery and reducing the internal resistance growth rate of the battery.

Based on the total mass of the separator, the alkali metal content in the first group of the alkali metal-containing polymer is critical, and when the content is 50 ppm to 100 ppm, the advantage is that a certain concentration of alkali metal ions helps to improve the ion conductivity of the separator.

Based on the total mass of the separator, the hydrogen content in the second group of the alkali metal-containing polymer is critical, when the content is 10-50 ppm, the advantage is that a certain hydrogen ion concentration may inhibit the electronic conductivity of the separator due to proton donating characteristics thereof, while an excessively high hydrogen ion concentration may occupy sites of the alkali metal ions, which is not conducive to the ion conductivity.

In some embodiments, a ratio of the alkali metal content in the first group to the hydrogen content in the second group is (1-10):1, e.g., (1-2):1, (2-3):1, (3-4):1, (4-5):1, (5-6):1, (6-7):1, (7-8):1, (8-9):1, or (9-10):1. When the separator based on this solution is used to the secondary battery, the internal resistance and/or cycle performance of the secondary battery may be improved.

In some embodiments, the alkali metal-containing polymer has a weight-average molecular weight of 100-5000. When the separator based on this solution is used to the secondary battery, the internal resistance and/or cycle performance of the secondary battery may be improved.

In some embodiments, the polymer chain is selected from a polyolefin chain, a polyester chain, and a polyepoxy alkyl chain. When the separator based on this solution is used to the secondary battery, the internal resistance and/or cycle performance of the secondary battery may be improved.

In some embodiments, the polyolefin chain includes a polyphenylene olefin chain, a polynitrile olefin chain, or a combination thereof. When the separator based on this solution is used to the secondary battery, the internal resistance and/or cycle performance of the secondary battery may be improved.

In some embodiments, the polyester chain includes a polycarboxylate chain. When the separator based on this solution is used to the secondary battery, the internal resistance and/or cycle performance of the secondary battery may be improved.

In some embodiments, the polyepoxy alkyl chain includes a polyalkyl ethylene glycol chain. When the separator based on this solution is used to the secondary battery, the internal resistance and/or cycle performance of the secondary battery may be improved.

In some embodiments, the organic acid alkali metal group is selected from a carboxylic acid alkali metal group, a sulfonic acid alkali metal group, a nitric acid alkali metal group, a phosphate alkali metal group, a boric acid alkali metal group, or a combination thereof. When the separator based on this solution is used to the secondary battery, the internal resistance and/or cycle performance of the secondary battery may be improved.

In some embodiments, the organic acid group is selected from a carboxylic acid group, a sulfonic acid group, a nitric acid group, a phosphoric acid group, a boric acid group, or a combination thereof. When the separator based on this solution is used to the secondary battery, the internal resistance and/or cycle performance of the secondary battery may be improved.

In some embodiments, one polymer chain includes an end group and a side chain group, one or more of the side chain groups being the first group and one or more of the end groups being the second group. When the separator based on this solution is used to the secondary battery, the internal resistance and/or cycle performance of the secondary battery may be improved.

In some embodiments, the alkali metal-containing polymer has a crosslinking agent group, the crosslinking agent group accounts for 0.1-10%, e.g., 0.1-1%, 1-2%, 2-3%, 3-4%, 4-5%, 5-6%, 6-7%, 7-8%, 8-9%, or 9-10% of a total mass of the alkali metal-containing polymer. When the separator based on this solution is used to the secondary battery, the internal resistance and/or cycle performance of the secondary battery may be improved.

In some embodiments, the alkali metal-containing polymer is a free radical polymer. When the separator based on this solution is used to the secondary battery, the internal resistance and/or cycle performance of the secondary battery may be improved.

In some embodiments, the alkali metal is selected from lithium, sodium, or potassium. When the separator based on this solution is used to the secondary battery, the internal resistance and/or cycle performance of the secondary battery may be improved.

In some embodiments, the polymer chain is expressed by a formula:

$$—(CH_2-CH_2)_x-(CH_2-CH_2-O)_y-(CH_2-\underset{\substack{|\\ R—IO_1Li}}{CH_2})_z-CH_2-CH_2-IO_1H$$

where R is a $C_{0-10}$ group, —$IO_1Li$ is the first group, and —$IO_1H$ is the second group; and where x=1-10, y=0-10, and z=1-10. When the separator based on this solution is used to the secondary battery, the internal resistance and/or cycle performance of the secondary battery may be improved.

In some embodiments, R includes one or more of an aromatic group, an oxygen-containing group, and a nitrogen-containing group. When the separator based on this solution is used to the secondary battery, the internal resistance and/or cycle performance of the secondary battery may be improved.

In some embodiments, R is phenyl or substituted phenyl, amide, or hydroxy. When the separator based on this solution is used to the secondary battery, the internal resistance and/or cycle performance of the secondary battery may be improved.

In some embodiments, —$IO_1Li$ is —$SO_3Li$, —$NO_2Li$, —$PO_3Li$ or —$BO_2Li$ or —OLi. When the separator based on this solution is used to the secondary battery, the internal resistance and/or cycle performance of the secondary battery may be improved.

In some embodiments, the —$IO_1H$ is —$SO_3H$, —$NO_2H$, —$PO_3H$ or —$BO_2H$. When the separator based on this solution is used to the secondary battery, the internal resistance and/or cycle performance of the secondary battery may be improved.

In some embodiments, the microporous layer includes a microporous matrix layer and a modified film, the modified film covering at least part of a surface of the microporous matrix layer, the modified film having the alkali metal-containing polymer. When the separator based on this solution is used to the secondary battery, the internal resistance and/or cycle performance of the secondary battery may be improved.

In some embodiments, the modified film has a thickness of 1-100 nanometers. When the separator based on this solution is used to the secondary battery, the internal resistance and/or cycle performance of the secondary battery may be improved. For example, the modified film has a thickness of 1-10 nm, 10-20 nm, 20-30 nm, 30-40 nm, 40-50 nm, 50-60 nm, 60-70 nm, 70-80 nm, 80-90 nm, and 90-100 nm.

In a second aspect, the present application provides a preparation method of a separator for a battery. The method includes:

providing a microporous matrix layer; and forming a modified film on at least part of a surface of the microporous matrix layer, where the modified film has an alkali metal-containing polymer, the alkali metal-containing polymer includes a polymer chain, and the polymer chain has a first group and a second group;

(a) the first group is selected from an organic acid alkali metal group, an alcohol alkali metal group, or a combination thereof;

(b) the second group is selected from an organic acid group;

an alkali metal content in the first group is 50-100 ppm based on a total mass of the separator; and a hydrogen content in the second group is 10-50 ppm based on the total mass of the separator.

A third aspect of the present application provides a secondary battery. The secondary battery includes the separator of any one of the above.

A fourth aspect of the present application provides a device. The device includes the secondary battery as described above.

Beneficial Effects

One or more embodiments of the present application have one or more of the following beneficial effects:

(1) The separator of the present invention has the alkali metal-containing polymer component. The separator is used for lithium-ion batteries, during the charging and discharging processes of the batteries:

the alkali metal-containing polymer component in the separator exists as an "ion channel", which effectively conducts lithium ions and improves the lithium ion conductivity of the separator matrix. The alkali metal-containing polymer has a specific degree of lithiation and can be effectively combined with matrix films.

(3) The "ion channel" formed by the alkali metal-containing polymer component can isolate transition metals (such as nickel ions) produced by electrolyte corrosion from shuttling to the surface of the negative electrode. After a plurality of charge-discharge cycles, ternary cathode materials may decompose to produce transition metal ions. In the present invention, the inventor creates the separator having the alkali metal-containing polymer, which is equivalent to providing a specific lithium ion channel for the separator matrix, such that transition metals and solvation molecules are prevented from shuttling to the surface of the negative electrode of the battery, and the decomposition on the SEI of the negative electrode by the transition metals is significantly slowed down, thereby ensuring the cycle stability of the battery.

(4) In some embodiments, the alkali metal-containing polymer component has the crosslinking agent which can effectively guide styrene and other monomers to polymerize on the surface of the separator to form a film, such that uniformity is ensured, and shedding is prevented through chemical bonding.

(5) In some embodiments, in the present application, benzoyl peroxide is selected as an initiator for the polymerization reaction. Benzoyl peroxide has good miscibility with the styrene monomer, and has a certain crosslinking effect on the surface of a polypropylene separator. On this basis, the introduction of divinylbenzene can play a good bridging role and effectively link polystyrene and polypropylene separators after monomer polymerization.

(6) The separator of the present application has good flexibility, stable interface and easy processing.

(7) When applied to a lithium-ion battery, the separator of the present application can improve the capacity retention of the battery and reduce the internal resistance growth rate of the battery.

ILLUSTRATIONS OF REFERENCE NUMERALS

Figure 1:
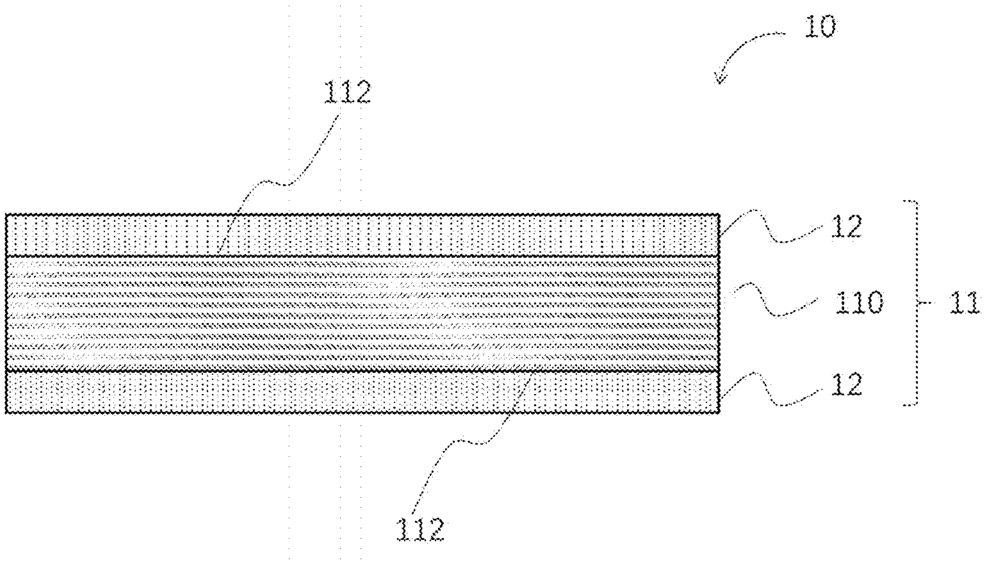
FIG. 1 shows a schematic structural diagram of a separator prepared according to one embodiment.

Battery pack 1; Upper case body 2; Lower case body 3; Battery module 4; Secondary battery 5; Housing 51; Electrode assembly 52; Cap assembly 53; Separator 10; Microporous layer 11; Microporous matrix layer 110; Side surface 112 of microporous matrix layer; Modified film 12; Positive plate 13; and Negative plate 14.

DETAILED DESCRIPTION OF EMBODIMENTS

Hereinafter, a separator and a preparation method thereof, a secondary battery and a device of the present application are described in detail with appropriate reference to the accompanying drawings. However, there will be cases where unnecessary details are omitted. For example, there are cases where detailed descriptions of well-known matters are omitted, and duplicate descriptions of the actually same structure are omitted. This is to avoid the following description becoming unnecessarily verbose for ease of understanding by those skilled in the art. In addition, the drawings and the following description are provided for the full understanding of the present application by those skilled in the art and are not intended to limit the subject matter recited in the claims.

The "range" disclosed in the present application is defined in the form of a lower limit and an upper limit, a given range being defined by selecting a lower limit and an upper limit that define the boundaries of a particular range. The ranges defined in this manner may include or exclude end values and may be arbitrarily combined, i.e., any lower limit may be combined with any upper limit to form a range. For example, if the ranges 60-120 and 80-110 are listed for a particular parameter, it is understood that the ranges 60-110 and 80-120 are also expected. In addition, if the minimum range values 1 and 2 are listed, and if the maximum range values 3, 4 and 5 are listed, the following ranges may all be expected: 1-3, 1-4, 1-5, 2-3, 2-4 and 2-5. In the present application, unless otherwise noted, the numerical range "a-b" denotes an abbreviated representation of any combination of real numbers between a and b, where both a and b are real numbers. For example, the numerical range "0-5" means that all the real numbers between "0-5" have been listed herein, and "0-5" is only an abbreviated representation of these numerical combinations. In addition, when a parameter is expressed as an integer greater than or equal to 2, it is equivalent to disclosing that the parameter is, for example, an integer 2, 3, 4, 5, 6, 7, 8, 9, 10, 11, 12, etc.

Unless otherwise specified, all embodiments and alternative embodiments of the present application may be combined to form new technical solutions.

Unless otherwise specified, all technical features and alternative technical features of the present application may be combined to form a new technical solution.

Unless otherwise specified, all steps of the present application may be performed sequentially or randomly, preferably sequentially. For example, a method includes steps (a) and (b), indicating that the method may include steps (a) and (b) performed sequentially, and may also include steps (b) and (a) performed sequentially. For example, the method may further include step (c), indicating that step (c) may be added to the method in any order, for example, the method may include steps (a), (b) and (c), or steps (a), (c) and (b), or steps (c), (a) and (b), etc.

Unless otherwise specified, references to "include" and "have" in the present application are open-ended and may also be closed-ended. For example, the "include" and "have" may indicate that other components not listed may also be included or contained, or only listed components may be included or contained.

Unless otherwise specified, the term "or" is inclusive in the present application. For example, the phrase "A or B" means "A, B, or both". More specifically, any of the following conditions satisfies the condition "A or B": A is true (being) and B is false (or not being); A is false (or not being) and B is true (or being); or both A and B are true (or being).

[Secondary Battery]

The secondary battery, also known as a rechargeable battery or storage battery, refers to the battery that may continue to be used by activating an active material by charging after the battery is discharged.

Usually, the secondary battery includes a positive plate, a negative plate, a separator, and an electrolyte. During the charging and discharging processes of the battery, active ions (such as lithium ions) are intercalated and deintercalated back and forth between the positive plate and the negative plate. The separator is arranged between the positive plate and the negative plate, which mainly plays the role of preventing short circuit between a positive electrode and a negative electrode and may allow active ions to pass through. The electrolyte is mainly used for conduction of active ions between the positive plate and the negative plate.

[Separator]

In some embodiments, the present application provides a separator. The separator includes a microporous layer. The microporous layer includes an alkali metal-containing polymer. The alkali metal-containing polymer includes a polymer chain. The polymer chain includes a first group and a second group.

(a) The first group is selected from an organic acid alkali metal group, an alcohol alkali metal group, or a combination thereof.

(b) The second group is selected from an organic acid group.

An alkali metal content in the first group is 50-100 ppm (e.g., 50-60 ppm, 60-70 ppm, 70-80 ppm, 80-90 ppm or 90-100 ppm) based on a total mass of the separator.

A hydrogen content in the second group is 10-50 ppm (e.g., 10-20 ppm, 20-30 ppm, 30-40 ppm, 40-50 ppm) based on the total mass of the separator.

Without theoretical limitation, the separator of the present invention includes the alkali metal-containing polymer component. The separator is used for a lithium-ion battery. In the charging and discharging processes of the battery, the alkali metal-containing polymer may not only improve the lithium ion conductivity of a separator matrix, but also isolate transition metal nickel ions produced by electrolyte corrosion from shuttling, to a surface of the negative electrode, and may also selectively block solvation molecules through micropores, so as to slow down the migration of transition metals Ni, Co and Mn to the negative electrode and catalytic decomposition on an SEI film during the storage or use of the battery, thereby improving the capacity retention of the battery and reducing the internal resistance growth rate of the battery.

Based on the total mass of the separator, the alkali metal content in the first group of the alkali metal-containing polymer is critical, and when the content is 50 ppm to 100 ppm, the advantage is that a certain concentration of alkali metal ions helps to improve the ion conductivity of the separator.

Based on the total mass of the separator, the hydrogen content in the second group of the alkali metal-containing polymer is critical, and when the content is 10-50 ppm, the advantage is that a certain hydrogen ion concentration may inhibit the electronic conductivity of the separator due to proton donating characteristics thereof, while an excessively high hydrogen ion concentration may occupy sites of the alkali metal ions, which is not conducive to the ion conductivity.

The alkali metal content in the first group is 50-100 ppm (e.g., 50-60 ppm, 60-70 ppm, 70-80 ppm, 80-90 ppm or 90-100 ppm) based on the total mass of the separator.

The hydrogen content in the second group is 10-50 ppm (e.g., 10-20 ppm, 20-30 ppm, 30-40 ppm, 40-50 ppm) based on the total mass of the separator.

The alkali metal content in the first group is 0.1%-10% (e.g., 0.5%, 1%, 2%, 3%, 4%, 5%, 6%, 7%, 8%, 9% or 10%) based on the total mass of the alkali metal-containing polymer.

The hydrogen content in the second group is 0.02%-0.1% (e.g., 0.02%, 0.04%, 0.06%, 0.08% or 0.1%) based on the total mass of the alkali metal-containing polymer.

In some embodiments, a ratio of the alkali metal content in the first group to the hydrogen content in the second group is (1-10):1, e.g., (1-2):1, (2-3):1, (3-4):1, (4-5):1, (5-6):1, (6-7):1, (7-8):1, (8-9):1, or (9-10):1. When the separator based on this solution is used to the secondary battery, the internal resistance and/or cycle performance of the secondary battery may be improved.

In some embodiments, the alkali metal-containing polymer has a weight-average molecular weight of 100-5000. When the separator based on this solution is used to the secondary battery, the internal resistance and/or cycle performance of the secondary battery may be improved.

In some embodiments, the polymer chain is selected from a polyolefin chain, a polyester chain, and a polyepoxy alkyl chain. When the separator based on this solution is used to the secondary battery, the internal resistance and/or cycle performance of the secondary battery may be improved.

In some embodiments, the polyolefin chain includes a polyphenylene olefin chain (e.g., a polystyrene chain), a polynitrile olefin chain, or a combination thereof. When the separator based on this solution is used to the secondary battery, the internal resistance and/or cycle performance of the secondary battery may be improved.

In some embodiments, the polyester chain includes a polycarboxylate chain. When the separator based on this solution is used to the secondary battery, the internal resistance and/or cycle performance of the secondary battery may be improved.

In some embodiments, the polyepoxy alkyl chain includes a polyalkyl ethylene glycol chain. When the separator based on this solution is used to the secondary battery, the internal resistance and/or cycle performance of the secondary battery may be improved.

In some embodiments, the organic acid alkali metal group is selected from a carboxylic acid alkali metal group, a sulfonic acid alkali metal group, a nitric acid alkali metal group, a phosphate alkali metal group, a boric acid alkali metal group, or a combination thereof. When the separator based on this solution is used to the secondary battery, the internal resistance and/or cycle performance of the secondary battery may be improved.

In some embodiments, the organic acid group is selected from a carboxylic acid group, a sulfonic acid group, a nitric acid group, a phosphoric acid group, a boric acid group, or a combination thereof. When the separator based on this solution is used to the secondary battery, the internal resistance and/or cycle performance of the secondary battery may be improved.

In some embodiments, a method for preparing the above-mentioned separator includes: perform hydrophilic modification on the polyolefin matrix film, A surface of the polyolefin matrix film subjected to the hydrophilic modification is rich in $—SO_3H$ ($—NO_2H$, $—PO_3H$ or $—BO_2H$) or —OM (M=Li, Na or K) groups, and $H^+$ or $M^+$ on the polyolefin surface may be exchanged with $Li^+$ by wetting and heating a lithium-containing solution to realize a lithiation process of a conversion from $—SO_3H$ to $—SO_3Li$. When the separator based on this solution is used to the secondary battery, the internal resistance and/or cycle performance of the secondary battery may be improved.

In some embodiments, the hydrophilic modification is an acid treatment or an alkali treatment. An acid source in the acid treatment is selected from one or more of sulfuric acid, nitric acid, phosphoric acid and boric acid. An alkali source in the alkali treatment is selected from one or more of lithium hydroxide, sodium hydroxide and potassium hydroxide. When the separator based on this solution is used to the secondary battery, the internal resistance and/or cycle performance of the secondary battery may be improved.

In some embodiments, one polymer chain includes an end group and a side chain group, one or more of the side chain groups being the first group, one or more of the end groups being the second group. When the separator based on this solution is used to the secondary battery, the internal resistance and/or cycle performance of the secondary battery may be improved.

In some embodiments, the alkali metal-containing polymer has a crosslinking agent group, and the crosslinking agent group accounts fix 0.1-10% of a total mass of the alkali metal-containing polymer. When the separator based on this solution is used to the secondary battery, the internal resistance and/or cycle performance of the secondary battery may be improved.

In some embodiments, the crosslinking agent is a combination of benzoyl peroxide and divinylbenzene. Benzoyl peroxide is the most widely used initiator in polymerization, which has good miscibility with styrene monomer, and has a certain crosslinking effect on the surface of a polypropylene separator. On this basis, the introduction of divinylbenzene may play a good bridging role and effectively link polystyrene and polypropylene separators after monomer polymerization. When the separator based on this solution is used to the secondary battery, the internal resistance and/or cycle performance of the secondary battery may be improved.

In some embodiments, the alkali metal-containing polymer is a free radical polymer. When the separator based on this solution is used to the secondary battery, the internal resistance and/or cycle performance of the secondary battery may be improved.

In some embodiments, the alkali metal is selected from lithium, sodium, or potassium. When the separator based on this solution is used to the secondary battery, the internal resistance and/or cycle performance of the secondary battery may be improved.

In some embodiments, the polymer chain is expressed by a formula:

$$-(CH_2-CH_2)_x-(CH_2-CH_2-O)_y-(CH_2-\underset{\substack{|\\ R-IO_1Li}}{CH_2})_z-CH_2-CH_2-IO_1H$$

where R is a $C_{0-10}$ group, $-IO_1Li$ is the first group, and $-IO_1H$ is the second group; and where x=1-10, y=0-10, and z=1-10. When the separator based on this solution is used to the secondary battery, the internal resistance and/or cycle performance of the secondary battery may be improved.

In some embodiments, x is 1-2, 2-3, 3-4, 4-5, 5-6, 6-7, 7-8, 8-9, or 9-10.

In some embodiments, y is 0, 1-2, 2-3, 3-4, 4-5, 5-6, 6-7, 7-8, 8-9, or 9-10.

In some embodiments, z is 1-2, 2-3, 3-4, 4-5, 5-6, 6-7, 7-8, 8-9, or 9-10.

In the above embodiments, when R is a $C_0$ group, it is to be understood that $IO_1Li$ is directly linked to a main chain.

In some embodiments, R includes one or more of an aromatic group, an oxygen-containing group, and a nitrogen-containing group.

In some embodiments, the aromatic group is $C_{6-10}$ phenyl or substituted phenyl. When the separator based on this solution is used to the secondary battery, the internal resistance and/or cycle performance of the secondary battery may be improved.

In some embodiments, the oxygen-containing group is a hydroxyl group (alcohol, phenol), an ether group, an aldehyde group, a ketone group, a carbonyl group, a carboxyl group, an ester group, an anhydride or nitro group. When the separator based on this solution is used to the secondary battery, the internal resistance and/or cycle performance of the secondary battery may be improved.

In some embodiments, the nitrogen-containing group is an amino, a cyano or an amide group. When the separator based on this solution is used to the secondary battery, the internal resistance and/or cycle performance of the secondary battery may be improved.

In some embodiments, R is phenyl or substituted phenyl, amide, or hydroxy.

In some embodiments, $-IO_1Li$ is $-SO_3Li$, $-NO_2Li$, $-PO_3Li$ or $-BO_2Li$ or $-OLi$.

In some embodiments, $-IO_1H$ is $-SO_3H$, $-NO_2H$, $-PO_3H$ or $-BO_2H$.

In some embodiments, the microporous layer includes a microporous matrix layer and a modified film. The modified film covers at least part of a surface of the microporous matrix layer. The modified film has the alkali metal-containing polymer.

In some embodiments, the modified film has a thickness of 1-100 nanometers.

In some embodiments, the present application provides a preparation method of a separator for a battery. The method includes:

provide a microporous matrix layer; and form a modified film on at least part of a surface of the microporous matrix layer.

The modified film has an alkali metal-containing polymer. The alkali metal-containing polymer includes a polymer chain. The polymer chain includes a first group and a second group.

(a) The first group is selected from an organic acid alkali metal group, an alcohol alkali metal group, or a combination thereof.

(b) The second group is selected from an organic acid group.

An alkali metal content in the first group is 50-100 ppm based on a total mass of the separator.

A hydrogen content in the second group is 10-50 ppm based on the total mass of the separator.

In some embodiments, monomers such as styrene, acrylonitrile, vinyl acetate and ethylene oxide are polymerized on the surface of the microporous matrix layer to form the modified film. The monomers have a high polymerization degree, and the polymerization product has good flexibility, stable interface and easy processing. The polymerization product has side groups, which may be hydrophilised by hydrophilic treatment and then lithiated by exchange of lithium ions.

In some embodiments, the present application provides a secondary battery. The secondary battery includes the separator of any one of the above.

In some embodiments, the present application provides a device. The device includes the secondary battery described above.

In some embodiments, a material of the microporous matrix layer may be selected from at least one of glass fiber, non-woven fabric, polyethylene, polypropylene, and polyvinylidene fluoride. The separator may be a single-layer film or a multi-layer laminated film. When the separator is a multi-layer laminated film, materials of each layer may be the same or different.

In some embodiments, the microporous matrix layer is a polyolefin separator of any one specified in GB/T 36363-2018 polyolefin separators for lithium-ion batteries.

In some embodiments, the performance/parameters of the separator of the present application are substantially identical to those described in GB/T 36363-2018 polyolefin separators for lithium-ion batteries.

In some embodiments, a test method of the separator mentioned in the present application may refer to GB/T 36363-2018 polyolefin separators for lithium-ion batteries.

[Positive Plate]

The positive plate generally includes a positive current collector and a positive film layer disposed on at least one surface of the positive current collector. The positive film layer includes a positive active material. A surface treatment composition may be provided between the positive current collector and the positive film layer.

As an example, the positive current collector has two opposite surfaces in a thickness direction thereof, and the positive film layer is disposed on either or both of the two opposite surfaces of the positive current collector.

In some embodiments, the positive current collector may be a metal foil or a composite current collector. For example, an aluminum foil may be used as the metal foil. The composite current collector may include a polymer material matrix layer and a metal layer formed on at least one surface of the polymer material matrix layer. The composite current collector may be formed by forming a metal material (aluminum, aluminum alloy, nickel, nickel alloy, titanium, titanium alloy, silver and silver alloy, etc.) on a polymer material substrate (a substrate of polypropylene (PP), polyethylene terephthalate (PET), polybutylene terephthalate (PBT), polystyrene (PS), polyethylene (PE), etc.).

In some embodiments, the positive active material may be a positive active material known in the art for batteries. As an example, the positive active material may include at least one of an olivine-type lithium-containing phosphate, a lithium transition metal oxide and respective modified compounds thereof. However, the present application is not limited to these materials, and other conventional materials that may be used as positive active materials of batteries are also available. The positive active materials may be used singly or in combination of two or more. Examples of the lithium transition metal oxide may include, but are not limited to, lithium cobalt oxides (such as $LiCoO_2$), lithium nickel oxides (such as $LiNiO_2$), lithium manganese oxides (such as $LiMnO_2$, $LiMn_2O_4$), lithium nickel cobalt oxides, lithium manganese cobalt oxides, lithium nickel manganese oxides, lithium nickel cobalt manganese oxides, such as $LiNi_{1/3}Co_{1/3}Mn_{1/3}O_2$ (also referred to as NCM333), $LiNi_{0.5}Co_{0.2}Mn_{0.3}O_2$ (also referred to as NCM523), $LiNi_{0.5}Co_{0.25}Mn_{0.25}O_2$ (also referred to as NCM211), $LiNi_{0.6}Co_{0.2}Mn_{0.2}O_2$ (also referred to as NCM622) and $LiNi_{0.8}Co_{0.1}Mn_{0.1}O_2$ (also referred to as NCM811), lithium nickel cobalt aluminum oxides (such as $LiNi_{0.85}Co_{0.15}Al_{0.05}O_2$) and a modified compound thereof, etc. Examples of the olivine-type lithium-containing phosphate may include, but are not limited to, at least one of lithium iron phosphate (e.g., $LiFePO_4$, also referred to as LFP), a composite of lithium iron phosphate and carbon, lithium manganese phosphate (e.g., $LiMnPO_4$), a composite of lithium manganese phosphate and carbon, lithium manganese iron phosphate, and a composite of lithium manganese iron phosphate and carbon.

In some embodiments, the positive film layer also optionally includes a surface treatment composition. As an example, the surface treatment may include at least one of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer and fluorinated acrylate resin.

In some embodiments, the positive film layer also optionally includes a conductive agent. As an example, the conductive agent may include at least one of superconducting carbon, acetylene black, carbon black, ketjen black, carbon dots, carbon nanotubes, graphene, and carbon nanofibers.

In some embodiments, the positive plate may be prepared by dispersing the above-described components used to prepare the positive plate, such as the positive active material, the conductive agent, the surface treatment, and any other components, in a solvent (e.g., N-methylpyrrolidone) to form a positive paste; and applying the positive paste on the positive current collector, and obtaining the positive plate after drying, cold pressing and other processes.

[Negative Plate]

The negative plate includes a negative current collector and a negative film layer disposed on at least one surface of the negative current collector. The negative film layer includes a negative active material. A surface treatment composition may be provided between the negative current collector and the negative film layer.

As an example, the negative current collector has two opposite surfaces in a thickness direction thereof, and the negative film layer is disposed on either or both of the two opposite two surfaces of the negative current collector.

In some embodiments, the negative current collector may be a metal foil or a composite current collector. For example, a copper foil may be used as the metal foil. The composite current collector may include a polymer material matrix layer and a metal layer formed on at least one surface of the polymer material matrix layer. The composite current collector may be formed by forming a metal material (copper, copper alloy, nickel, nickel alloy, titanium, titanium alloy, silver and silver alloy, etc.) on a polymer material substrate (a substrate of polypropylene (PP), polyethylene terephthalate (PET), polybutylene terephthalate (PBT), polystyrene (PS), polyethylene (PE), etc.).

In some embodiments, the negative active material may be a negative active material known in the art for batteries. As examples, the negative active material may include at least one of artificial graphite, natural graphite, soft carbon, hard carbon, silicon-based material, tin-based material, lithium titanate and the like. The silicon-based material may be selected from at least one of a monolithic silicon, a silicon-oxygen compound, a silicon-carbon complex, a silicon-nitrogen complex and a silicon alloy. The tin-based material may be selected from at least one of a monolithic tin, a tin-oxygen compound and a tin alloy. However, the present application is not limited to these materials, and other conventional materials that may be used as negative active materials of batteries are also available. The negative active materials may be used singly or in combination of two or more.

In some embodiments, the negative film layer also optionally includes a surface treatment. As an example, the surface treatment may be selected from at least one of styrene butadiene rubber (SBR), polyacrylic acid (PAA), sodium polyacrylate (PAAS), polyacrylamide (PAM), polyvinyl alcohol (PVA), sodium alginate (SA), polymethacrylic acid (PMAA), and carboxymethyl chitosan (CMCS).

In some embodiments, the negative film layer also optionally includes a conductive agent. As an example, the conductive agent may be selected from at least one of superconducting carbon, acetylene black, carbon black, ketjen black, carbon dots, carbon nanotubes, graphene, and carbon nanofibers.

In some embodiments, the negative film layer also optionally includes other additives such as thickeners (e.g., sodium carboxymethyl cellulose (CMC-Na).

In some embodiments, the negative plate may be prepared by dispersing the above-described components used to prepare the negative plate, such as the negative active material, the conductive agent, the surface treatment, and any other components, in a solvent (such as deionized water) to form a negative paste; and applying the negative paste on the negative current collector, and obtaining the negative plate after drying, cold pressing and other processes.

[Electrolyte]

Electrolyte is used for conducting ions between the positive plate and the negative plate. There are no specific restrictions on the type of electrolyte in the present application, and the type of electrolyte may be selected as required. For example, the electrolyte may be in liquid, gel or all-solid form.

In some embodiments, the electrolyte is liquid and includes an electrolyte salt and a solvent.

In some embodiments, the electrolyte salt may be selected from at least one of lithium hexafluorophosphate, lithium tetrafluoroborate, lithium perchlorate, lithium hexafluoroarsenate, lithium bis(fluorosulfolyl)imide, lithium bis(trifluoromethanesulfonyl)imide, lithium trifluoromethanesulfonate, lithium difluorophosphate, lithium difluoroxalate, lithium bis(oxalate) borate, lithium difluorodioxalate, lithium phosphate tetrafluoroxalate.

In some embodiments, the solvent may be selected from at least one of ethylene carbonate, propylene carbonate, methyl ethyl carbonate, diethyl carbonate, dimethyl carbonate, dipropyl carbonate, methylpropyl carbonate, ethyl propyl carbonate, butyl carbonate, ethylene fluorocarbonate, methyl formate, methyl acetate, ethyl acetate, propyl acetate, methyl propionate, ethyl propionate, propyl propionate, methyl butyrate, ethyl butyrate, 1,4-butyrolactone, cyclobutane sulfone, dimethyl sulfone, methyl ethyl sulfone, and diethyl sulfone.

In some embodiments, the electrolyte also optionally includes an additive. As an example, the additive may include a negative film-forming additive, a positive film-forming additive, and may also include additives capable of improving certain performance of the battery, such as an additive for improving overcharge performance of the battery and an additive for improving high-temperature or low-temperature performance of the battery.

In some embodiments, the positive plate, the negative plate, and the separator may be prepared into an electrode assembly by a winding process or a lamination process.

In some embodiments, the secondary battery may include an outer package. The outer package may be used for encapsulating the electrode assembly and the electrolyte.

In some embodiments, the outer package of the secondary battery may be a hard case, such as a hard plastic case, an aluminum case and a steel case. The outer package of the secondary battery may also be a pouch, such as a bag-type pouch. The material of the pouch may be plastic, such as polypropylene, polybutylene terephthalate and polybutylene succinate.

Figure 3:
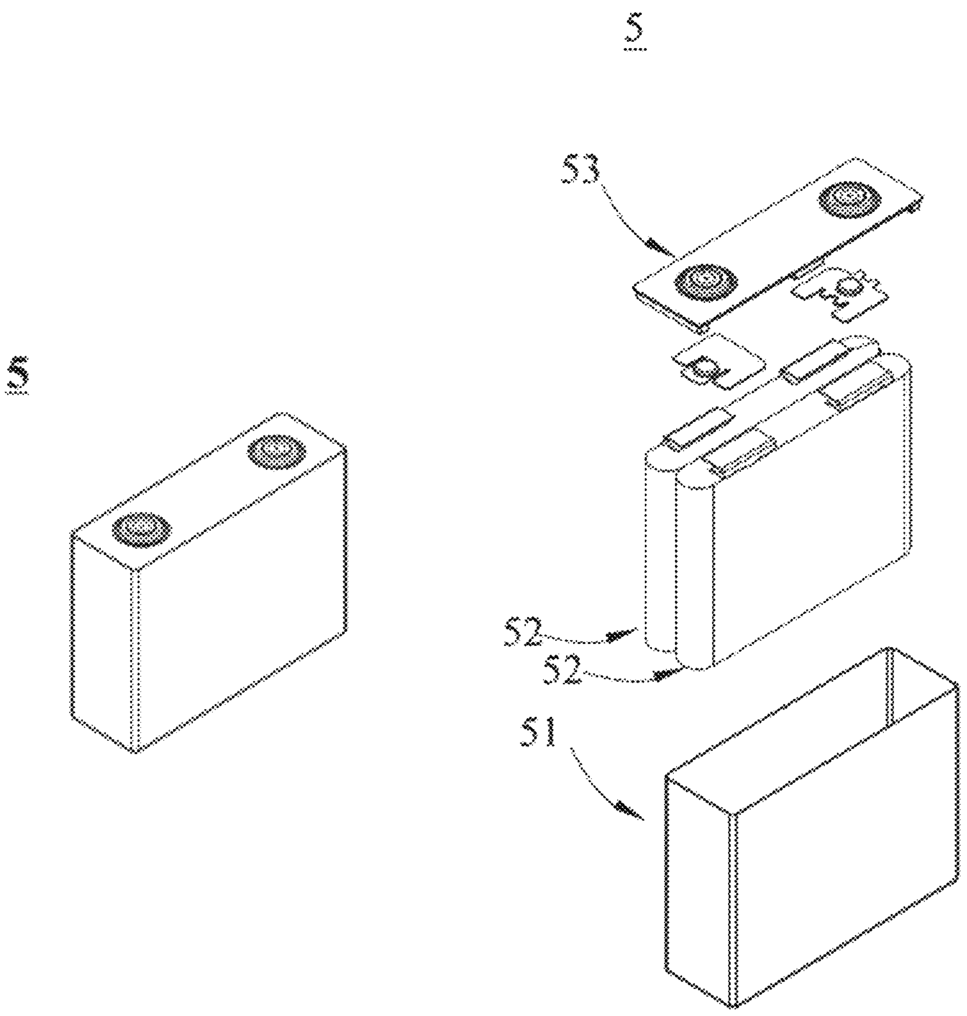
FIG. 3 is an overall view and an exploded view of a secondary battery according to an embodiment of the present application.

The shape of the secondary battery is not specifically limited in the present application, which may be cylindrical, square or any other shape. For example. FIG. 3 is an overall view and an exploded view of the secondary battery 5 of a square structure as an example.

In some embodiments, referring to FIG. 3, the outer package may include a housing 51 and a cover plate 53. The housing 51 may include a bottom plate and a side plate connected to the bottom plate, and the bottom plate and the side plate define an accommodating cavity. The housing 51 has an opening communicating with the accommodating cavity, and the cover plate 53 may cover the opening to close the accommodating cavity. The positive plate, the negative plate, and the separator may be prepared into the electrode assembly 52 by a winding process or a lamination process. The electrode assembly 52 is encapsulated in the accommodating cavity. The electrolyte is infiltrated in the electrode assembly 52. The secondary battery 5 may include one or more electrode assemblies 52, the number of which may be selected by a person skilled in the art according to specific actual needs.

In some embodiments, the secondary batteries may be assembled into a battery module, and the battery module may include one or more secondary batteries, the specific number of which may be selected by a person skilled in the art according to the application and capacity of the battery module.

Figure 4:
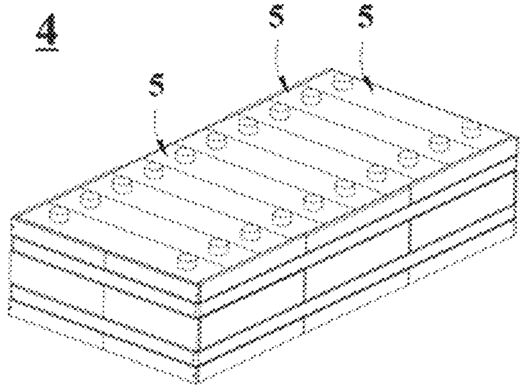
FIG. 4 is a schematic diagram of a battery module according to an embodiment of the present application.

FIG. 4 shows a battery module 4 as an example. Referring to FIG. 4, in the battery module 4, a plurality of secondary batteries 5 may be arranged sequentially along a length direction of the battery module 4. Of course, the secondary batteries may also be arranged in any other way. Further, the plurality of secondary batteries 5 may be fixed with fasteners.

Optionally, the battery module 4 may also include a shell having an accommodating space in which the plurality of secondary batteries 5 are accommodated.

In some embodiments, the battery modules may also be assembled into a battery pack, and the battery pack may include one or more battery modules, the specific number of which may be selected by a person skilled in the art according to the application and capacity of the battery pack.

Figure 5:
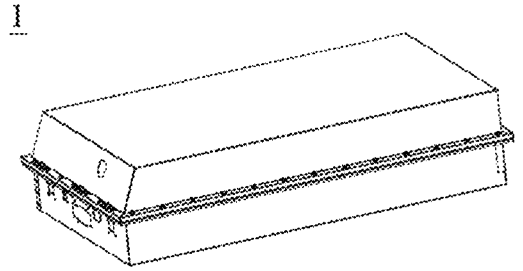
FIG. 5 is a schematic diagram of a battery pack according to an embodiment of the present application.
Figure 6:
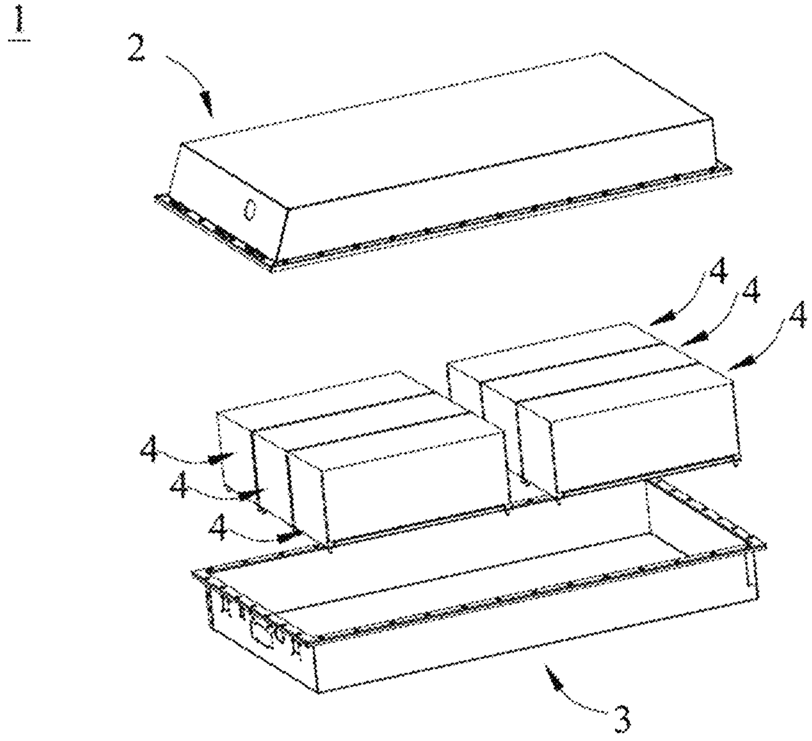
FIG. 6 is an exploded view of the battery pack according to an embodiment of the present application shown in FIG. 5.

FIG. 5 and FIG. 6 show a battery pack 1 as an example. Referring to FIG. 5 and FIG. 6, the battery pack 1 may include a battery case and a plurality of battery modules 4 provided in the battery case. The battery case includes an upper case body 2 and a lower case body 3. The upper case body 2 may cover the lower case body 3 and forms a closed space for accommodating the battery modules 4. The plurality of battery modules 4 may be arranged in the battery case in any way.

In addition, the present application further provides an electrical device. The electrical device includes at least one of a secondary battery, a battery module or a battery pack provided by the present application. The secondary battery, the battery module, or the battery pack may be used as a power source of the electrical device, and may also be used as an energy storage unit of the electrical device. The electric device may include, but is not limited to, mobile devices (e.g., mobile phones, and notebook computers), electric vehicles (e.g., pure electric vehicles, hybrid electric vehicles, plug-in hybrid electric vehicles, electric bicycles, electric scooters, electric golf carts, and electric trucks), electric trains, ships and satellites, energy storage systems, etc.

As the electric device, a secondary battery, a battery module or a battery pack may be selected according to the use requirements of the electric device.

Figure 7:
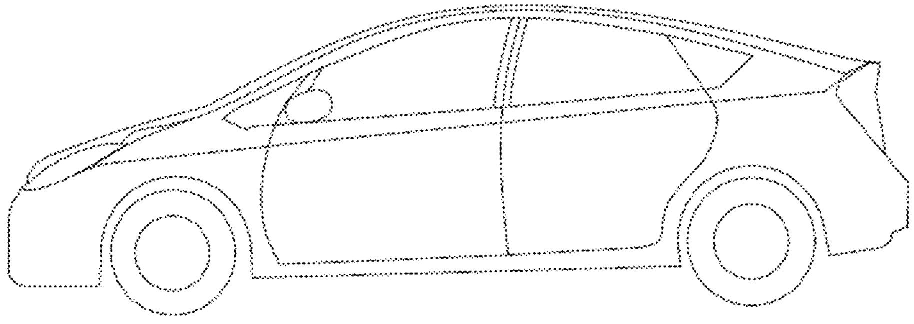
FIG. 7 is a schematic diagram of an electric device in which a secondary battery is used as a power source according to an embodiment of the present application.

FIG. 7 shows an electric device as an example. The electric device is a pure electric vehicle, a hybrid electric vehicle, or a plug-in hybrid electric vehicle, etc. In order to meet the demand for high power and high energy density of the secondary battery, a battery pack or a battery module may be used.

EMBODIMENTS

Embodiments of the present application are described hereinafter. The embodiments described below are illustrative and are intended only to interpret the present application, rather to be construed as limiting the present application. If no specific technology or conditions are indicated in the embodiments, the embodiments shall be carried out according to the technology or conditions described in the literature in the art or according to the product specification. The reagents or instruments used, where the manufacturer is not specified, are conventional products available commercially.

Preparation of the Separator

Embodiment 1

The separator of Embodiment 1 is prepared by the following method:

100 g of a polypropylene (PP) microporous separator for a lithium-ion battery was provided as a microporous separator matrix.

7 g of benzoyl peroxide (initiator) and 100 g of p-divinylbenzene (monomer B) were dissolved in 700 g of styrene (monomer A) and stirred uniformly to obtain a homogeneous monomer solution. The contents of the monomer A, the monomer B and the initiator in the monomer solution of Embodiment 1 are shown in Table 1.

The monomer solution was directly applied on surfaces of both sides of the microporous separator matrix, then stood for 10 min, and then stood for 8 h under the vacuum condition of 80° C., so that the monomer solution is polymerized on the surfaces of both sides of the matrix to form a polymer modified film (in this embodiment, the polymer was polystyrene), and then the unreacted monomer on the surfaces of the matrix was washed away with acetone.

The product of the previous step was placed in a hydrophilic treatment agent (sulfuric acid aqueous solution with a concentration of 1 M) and kept at 80° C. for 24 h, so that a surface of the modified film was grafted with sulfonic acid groups, then washed with deionized water and then dried.

The product of the previous step was placed in an aqueous solution of $LiCO_3$ at a concentration of 1 M, and stirred at 25° C. for 24 h, so that part of hydrogen ions of the sulfonic acid groups were replaced by lithium ions, and a lithium-containing polymer (alkali metal-containing polymer) was formed.

The product of the previous step was washed with deionized water and then dried to obtain the separator of Embodiment 1.

FIG. 1 shows a schematic diagram of the separator according to above embodiment. The separator 10 includes a microporous layer 11, the microporous layer 11 includes a microporous matrix layer 110 and a modified film 12, the modified film 12 covers a side surface 112 of the microporous matrix layer, the modified film 112 has the alkali metal-containing polymer, the alkali metal-containing polymer includes a polymer chain, and the polymer chain includes a first group and a second group.

Embodiments 2 to 7

Embodiments 2 to 7 differ from Embodiment 1 in the contents and/or types of the monomer A, the monomer B, the initiator and the hydrophilic treatment agent. The specific contents of the monomer A, the monomer B, the initiator and the hydrophilic treatment agent are shown in Table 1.

In particular, in Embodiment 5, the monomer A of Embodiment 1 was replaced with a combination of two monomers including 350 g of styrene and 350 g of vinyl acetate.

Comparative Embodiments 1 to 4

Comparative embodiments 1 to 4 differ from Embodiment 1 in the contents and/or types of the monomer A, the monomer B, monomer C, the initiator and the hydrophilic treatment agent. The specific contents of the monomer A, the monomer B, the monomer C, the hydrophilic treatment agent and the initiator are shown in Table 1.

Blank Embodiment

The blank embodiment differs from Embodiment 1 in that a polypropylene (PP) microporous separator without a modified film is directly used in the blank embodiment.

TABLE 1

| | Monomer A | | Monomer B | | Initiator | | Hydrophilic treatment agent |
|---|---|---|---|---|---|---|---|
| Blank embodiment | — | — | — | — | — | — | |
| Embodiment 1 | Styrene | 700 g | P-divinylbenzene | 100 g | Benzoyl peroxide | 7 g | 1M sulfuric acid aqueous solution |
| Embodiment 2 | Vinyl acetate | 700 g | P-divinylbenzene | 100 g | Benzoyl peroxide | 7 g | 1M sulfuric acid aqueous solution |
| Embodiment 3 | Styrene | 100 g | P-divinylbenzene | 100 g | Benzoyl peroxide | 7 g | 1M sulfuric acid aqueous solution |
| Embodiment 4 | Ethylene oxide | 100 g | P-divinylbenzene | 100 g | Benzoyl peroxide | 43 g | 1M sulfuric acid aqueous solution |
| Embodiment 5 | Styrene<br>Vinyl acetate | 350 g<br>350 g | P-divinylbenzene | 100 g | Benzoyl peroxide | 7 g | 1M sulfuric acid aqueous solution |
| Embodiment 6 | Styrene | 700 g | P-divinylbenzene | 100 g | Benzoyl peroxide | 7 g | 1M sulfuric acid aqueous solution |

TABLE 1-continued

| | Monomer A | | Monomer B | | Initiator | | Hydrophilic treatment agent |
|---|---|---|---|---|---|---|---|
| Embodiment 7 | Styrene | 700 g | P-divinylbenzene | 100 g | Benzoyl peroxide | 7 g | 1M sulfuric acid aqueous solution |
| Comparative embodiment 1 | Vinyl acetate | 700 g | P-divinylbenzene | 0.1 g | Benzoyl peroxide | 0.007 g | 1M sulfuric acid aqueous solution |
| Comparative embodiment 2 | Ethylene oxide | 700 g | P-divinylbenzene | 71 g | Benzoyl peroxide | 36 g | 1M sulfuric acid aqueous solution |
| Comparative embodiment 3 | Ethylene oxide | 700 g | P-divinylbenzene | 97.3 g | Benzoyl peroxide | 0.07 g | 1M sulfuric acid aqueous solution |
| Comparative embodiment 4 | Styrene | 700 g | P-divinylbenzene | 1 g | Benzoyl peroxide | 0.07 g | 1M sulfuric acid aqueous solution |

The separators prepared in the embodiments and the comparative embodiments have a lithium-containing polymer. The general formula of the lithium-containing polymer is as follows:

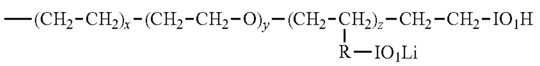

The alkali metal-containing polymer includes a polymer chain, and the polymer chain includes a first group and a second group.

(a) The first group is an organic acid alkali metal group (organic acid lithium group $IO_1Li$).

(b) The second group is an organic acid group (sulfonic acid group $IO_1H$).

The alkali metal-containing polymers in the embodiments and the comparative embodiments are shown in Table 2 below. For Embodiment 2, Comparative embodiments 1 and 4, ester side chains undergo hydrolysis during acid treatment to form —OH side groups and acetic acid, and finally lithiated to —O—Li. In addition, the divinylbenzene serving as a crosslinking agent is not written into the general formula.

TABLE 2

| | Structural formula of lithium-containing polymer |
|---|---|
| Embodiment 1 | 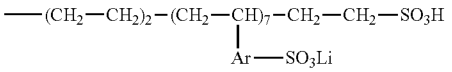 |
| Embodiment 2 | 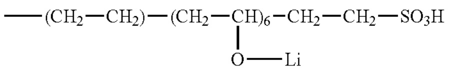 |
| Embodiment 3 | 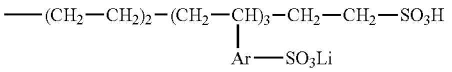 |
| Embodiment 4 | 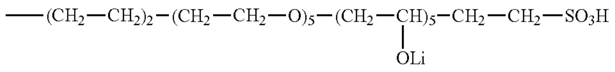 |
| Embodiment 5 | 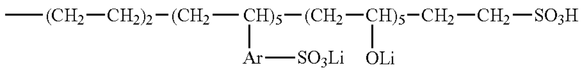 |
| Embodiment 6 | 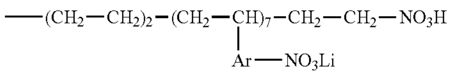 |
| Embodiment 7 | 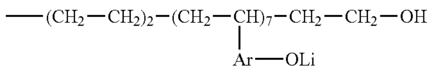 |
| Comparative embodiment 1 | 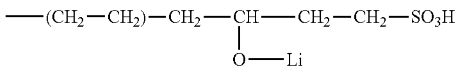 |
| Comparative embodiment 2 | 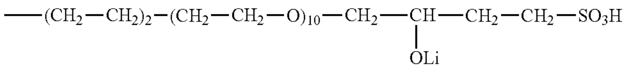 |

TABLE 2-continued

| | Structural formula of lithium-containing polymer |
|---|---|
| Comparative embodiment 3 | 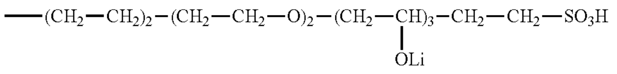 |
| Comparative embodiment 4 | 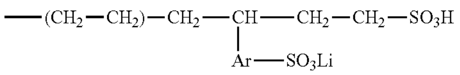 |

Preparation of a Lithium-Ion Battery

The separators of Embodiments 1 to 7 and Comparative embodiments 1 to 4 were applied to lithium-ion batteries. A specific method is as follows:

A nickel-cobalt-manganese (NCM) ternary material, conductive agent carbon black, a binder of polyvinylidene fluoride (PVDF) and N-methylpyrrolidone (NMP) are evenly mixed according to a weight ratio of 97.36:28.86:2.7:1.1 to obtain a positive paste; and then the positive paste is applied uniformly on the positive current collector, and the positive plate is obtained after drying, cold pressing and slitting.

The negative paste is prepared by dissolving active material artificial graphite, conductive agent carbon black, a binder of styrene butadiene rubber (SBR) and a thickener of sodium hydroxymethyl cellulose (CMC) in solvent deionized water according to a weight ratio of 96.2:0.8:0.8:1.2, and mixing evenly; and the negative paste is applied uniformly on a copper foil on the negative current collector one or more times, and the negative plate is obtained after drying, cold pressing and slitting.

In an argon atmosphere glove box ($H_2O$<0.1 ppm, $O_2$<0.1 ppm), the organic solvent vinyl carbonate (EC)/methyl ethyl carbonate (EMC) was uniformly mixed according to the volume ratio of 3/7, and 12.5% $LiPF_6$ lithium salt was added and dissolved in the organic solvent, and stirred uniformly to obtain the electrolyte of Embodiment 1.

The positive plate, the separator and the negative plate are laminated in sequence, so that the separator is placed between the positive plate and the negative plate for isolation, then winding is performed to obtain a bare cell, tabs are welded to the bare cell, the bare cell is assembled into an aluminum case to be baked at 80° C. to remove water, and then electrolyte is injected and sealed to obtain an uncharged battery. The uncharged battery is sequentially subjected to the processes of standing, hot and cold pressing, formation, shape-making, capacity testing, etc., to obtain the lithium-ion battery products of each embodiment and comparative embodiment.

Figure 2:
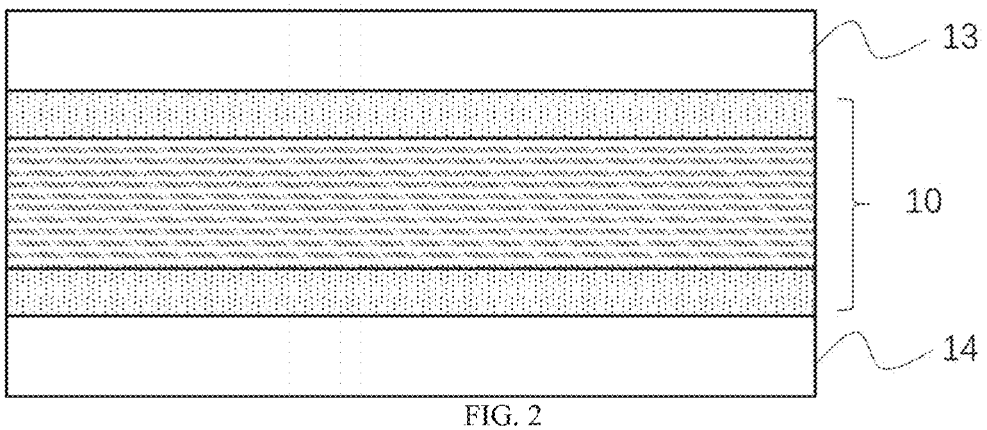
FIG. 2 shows a schematic structural diagram of a battery according to one embodiment.

FIG. 2 shows a schematic diagram of the lithium-ion battery of the above-described embodiment. The lithium-ion battery includes the positive plate 13, the negative plate 14, and the separator 10 provided between the positive plate 13 and the negative plate 14.

Analysis and Detection

[Battery Performance Test]

1. Test on Battery Capacity Retention

A test process of battery capacity retention is as follows: at 25° C., the battery to be tested is charged to 4.3 V at a constant current of ⅓ C, then charged to a current of 0.05 C at a constant voltage of 4.3 V, set aside for 5 min, and then discharged to 2.8 V at ⅓ C, and the obtained capacity is recorded as an initial capacity C0. The above steps are repeatedly performed for the same battery, meanwhile, the discharge capacity Cn of the battery after an n-th cycle is recorded, and the battery capacity retention after each cycle is Pn=Cn/C0*100%. By taking 100 point values of P1, P2, . . . , P100 as the ordinate and the corresponding cycle times as the abscissa, a curve of the battery capacity retention and cycle times corresponding to the lithium manganate positive active material of Embodiment 1 shown in FIG. 4.

In this test process, a first cycle corresponds to n=1, a second cycle corresponds to n=2, . . . , a 100th cycle corresponds to n=100. The battery capacity retention data in Table 3 is the data measured after 100 cycles under the above test conditions, that is, the value of P100.

2. Test on Battery DC Resistance (DCR)

A test process of the battery DC impedance is as follows: at 25° C., the battery corresponding to Embodiment 1 is charged to 4.3 V at a constant current of ⅓ C, then charged to a current of 0.05 C at a constant voltage of 4.3 V, and set aside for 5 min, and a voltage V1 is recorded. The battery is then discharged at ⅓ C for 30 s, a voltage V2 is recorded, and the internal resistance DCR1 of the battery after the first cycle is obtained based on (V2−V1)/⅓ C. The above steps are repeatedly performed for the same battery, and meanwhile, the internal resistance $DCR_n$ (n=1, 2, 3, . . . , 100) of the battery after the nth cycle is recorded.

In this test process, the first cycle corresponds to n=1, the second cycle corresponds to n=2, . . . , the 100th cycle corresponds to n=100. The battery internal resistance growth rate Q100=(DCRn−DCR1)/DCR1×100% in Table 3, and the data in Table 3 is the data measured after 100 cycles under the above test conditions.

[Lithiation Performance Test]

1. Test on the Thickness of the Modified Film

A separator sample was treated by cross-section polishing (CP) at −20° C. and 3 kV for 1 h to obtain a section. The section was observed under a scanning electron microscope (SEM), and the thickness of the modified film was measured.

2. Test on the Lithium Content in the First Group 1 g of separator sample was melted into 3 mL of hydrochloric acid and 1 mL of nitric acid to be soaked for 3 h. 5 mL of $H_2O$ was added, which was then carefully sucked into a 25 mL volumetric flask, water continued to be added to wash a bubble flask, and washing liquid was sucked into the volumetric flask for calibration; and after the solution in the volumetric flask was filtered, 10 mL of the solution was retained for inductively coupled plasma optical emission spectroscopy (ICP-OES). If a test result is $C_m$, the formula of the actual lithium content is:

$$\text{Lithium content}=C_m\times1\times10^{-3}\times25(\text{unit:ppm})$$

3. Test on the Hydrogen Content in the Second Group 1 g of separator with a radius of R cm was cut and placed in an infrared transmission chamber, and a background is captured. After vacuum adsorption of pyridine at room temperature, a sample signal was collected when the temperature was raised to 100° C., and the infrared spectrum of B acid intensity at 1540 $cm^{-1}$ of the separator was obtained by subtracting the background. The absorption factor at this place was $\varepsilon$=1.67 $cm^2/\mu mol$. If a test result is $I_m$, the formula of the actual acid hydroxyl hydrogen content is:

$$\text{Hydrogen content}=3.14\times R^2\times I_m/4/\varepsilon\times 1000(\text{unit:ppm})$$

The above tests were carried out on the separators of the embodiments and the comparative embodiments and the batteries to which the separators were applied, and the results are shown in Table 3 below:

TABLE 3

| | Thickness of modified film | Hydrogen content n ppm | Lithium content m ppm | Perme-ability (sec/100 cc) | Battery internal resistance growth rate Q100 | Cycle capacity retention P100 |
|---|---|---|---|---|---|---|
| Blank embodiment | Polypropylene microporous separator without the modified film | | | 180 | Baseline 100% | Baseline 100% |
| Embodiment 1 | 20 nm | 1 | 97 | 173 | 89.6% | 111.1% |
| Embodiment 2 | 20 nm | 15 | 97 | 175 | 88.8% | 111.1% |
| Embodiment 3 | 20 nm | 48 | 79 | 175 | 92.0% | 107.1% |
| Embodiment 4 | 20 nm | 20 | 63 | 176 | 95.0% | 106.8% |
| Embodiment 5 | 20 nm | 16 | 88 | 174 | 89.8% | 109.7% |
| Embodiment 6 | 20 nm | 12 | 93 | 172 | 90.1% | 110.6% |
| Embodiment 7 | 20 nm | 13 | 92 | 172 | 89.8% | 110.3% |
| Comparative embodiment 1 | 20 nm | 27 | 28 | 179 | 100.0% | 100.2% |
| Comparative embodiment 2 | 20 nm | 2 | 65 | 171 | 96.0% | 101.9% |
| Comparative embodiment 3 | 20 nm | 29 | 44 | 167 | 96.8% | 100.9% |
| Comparative embodiment 4 | 20 nm | 57 | 55 | 172 | 97.2% | 100.1% |

* In Table 3, the rate of change of the corresponding values of the embodiments and the comparative embodiments with respect to the reference value is calculated using the values measured in the blank embodiment as the reference value.

As shown in Tables 1 to 3, in the separators of Embodiments 1 to 7, the content of the alkali metal (lithium) in the first group is 50 ppm to 100 ppm based on the total mass of the separator. The hydrogen content in the second group is 10 ppm to 50 ppm. When the separators of Embodiments 1 to 7 were used for lithium-ion batteries, the lithium-ion batteries exhibit significantly reduced battery internal resistance and significantly improved battery capacity retention.

In the separators of Comparative embodiments 1 to 4, the alkali metal content in the first group is not in the range of 50 ppm to 100 ppm, or the hydrogen content in the second group is not in the range of 10 ppm to 50 ppm based on the total mass of the separator. When the separators of Comparative embodiments 1 to 4 were used for lithium-ion batteries, the battery internal resistance and battery capacity retention of the lithium-ion batteries were not improved as much as those of Embodiments 1 to 7.

In summary, the present application provides the separator, the separator includes the microporous layer, the microporous layer includes the alkali metal-containing polymer, the alkali metal-containing polymer includes the polymer chain, and the polymer chain includes the first group and the second group;

(a) the first group is selected from an organic acid alkali metal group, an alcohol alkali metal group, or a combination thereof;

(b) the second group is selected from an organic acid group;

the alkali metal content in the first group is 50-100 ppm based on the total mass of the separator; and the hydrogen content in the second group is 10-50 ppm based on the total mass of the separator.

When the separator is used for the lithium-ion battery, the lithium-ion battery exhibits significantly reduced internal resistance and significantly improved battery capacity retention.

It is to be noted that the present application is not limited to the above embodiments. The above-mentioned embodiments are merely illustrative, and all embodiments having substantially the same structure as the technical idea and exerting the same function and effect within the scope of the technical solution of the present application fall within the technical scope of the present application. Further, without departing from the scope of the present application, other embodiments constructed by imposing various modifications that are conceivable to those skilled in the art to the embodiments, and by combining a part of the elements of the embodiments also fall within the scope of the present application.

The invention claimed is:

1. A separator, comprising: a microporous layer, wherein the microporous layer comprises an alkali metal-containing polymer, the alkali metal-containing polymer comprises a polymer chain, and the polymer chain comprises a first group and a second group;

(a) the first group is selected from an organic acid alkali metal group, an alcohol alkali metal group, or a combination thereof;

(b) the second group is selected from an organic acid group;

an alkali metal content in the first group is 50-100 ppm based on a total mass of the separator; and a hydrogen content in the second group is 10-50 ppm based on the total mass of the separator.

2. The separator according to claim 1, wherein a ratio of the alkali metal content in the first group to the hydrogen content in the second group is (1-10):1.

3. The separator according to claim 1, wherein the alkali metal-containing polymer has a weight average molecular weight of 100 to 5000.

4. The separator according to claim 1, wherein the polymer chain is selected from a poly olefin chain, a polyester chain, and a polyepoxy alkyl chain.

5. The separator according to claim 4, having one or more of the following features:

(1) the polyolefin chain comprising a polyphenylene olefin chain, a polynitrile olefin chain, or a combination thereof;

(2) the polyester chain comprising a polycarboxylate chain; and (3) the polyepoxy alkyl chain comprising a polyalkyl ethylene glycol chain.

6. The separator according to claim 1, wherein the organic acid alkali metal group is selected from a carboxylic acid alkali metal group, a sulfonic acid alkali metal group, a nitric acid alkali metal group, a phosphate alkali metal group, a boric acid alkali metal group, or a combination thereof.

7. The separator according to claim 1, wherein the organic acid group is selected from a carboxylic acid group, a sulfonic acid group, a nitric acid group, a phosphoric acid group, a boric acid group, or a combination thereof.

8. The separator according to claim 1, wherein one polymer chain comprises an end group and a side chain group, one or more of the side chain groups being the first group, one or more of the end groups being the second group.

9. The separator according to claim 1, wherein the alkali metal-containing polymer has a crosslinking agent group, and the crosslinking agent group accounts for 0.1-10% of a total mass of the alkali metal-containing polymer.

10. The separator according to claim 1, wherein the alkali metal-containing polymer is a free radical polymer.

11. The separator according to claim 1, wherein the alkali metal is selected from lithium, sodium, or potassium.

12. The separator according to claim 1, wherein the polymer chain is expressed by a formula:

$$-(CH_2-CH_2)_x-(CH_2-CH_2-O)_y-(CH_2-\underset{\displaystyle R-IO_1Li}{\underset{|}{CH_2}})_z-CH_2-CH_2-IO_1H$$

wherein R is a $C_{0-10}$ group, —$IO_1Li$ is the first group, and —$IO_1H$ is the second group; and wherein x=1-10, y=0-10, and z=1-10.

13. The separator according to claim 12, wherein R comprises one or more of an aromatic group, an oxygen-containing group, and a nitrogen-containing group.

14. The separator according to claim 12, characterized by one or more of the following:

(1) R being phenyl or substituted phenyl, amide, or hydroxy;

(2) —IO1Li being —$SO_3Li$, —$NO_2Li$, —$PO_3Li$ or —$BO_2Li$ or —OLi; and (3) —$IO_1H$ being —$SO_3H$, —$NO_2H$, —$PO_3H$ or —$BO_2H$.

15. The separator according to claim 1, wherein the microporous layer comprises a microporous matrix layer and a modified film, the modified film covering at least part of a surface of the microporous matrix layer, the modified film having the alkali metal-containing polymer.

16. The separator according to claim 1, wherein the modified film has a thickness of 1-100 nanometers.

17. A preparation method of a separator for a battery, comprising:

providing a microporous matrix layer; and forming a modified film on at least part of a surface of the microporous matrix layer, wherein the modified film has an alkali metal-containing polymer, the alkali metal-containing polymer comprises a polymer chain, and the polymer chain comprises a first group and a second group;

(a) the first group is selected from an organic acid alkali metal group, an alcohol alkali metal group, or a combination thereof;

(b) the second group is selected from an organic acid group;

an alkali metal content in the first group is 50-100 ppm based on a total mass of the separator; and a hydrogen content in the second group is 10-50 ppm based on the total mass of the separator.

18. A secondary battery, comprising the separator according to claim 1.

19. A device, comprising the secondary battery according to claim 18.

* * * * *